US008803730B2

(12) United States Patent
Jiang (10) Patent No.: US 8,803,730 B2
(45) Date of Patent: Aug. 12, 2014

(54) RADAR PULSE DETECTION USING A DIGITAL RADAR RECEIVER

(75) Inventor: Qin Jiang, Oak Park, CA (US)

(73) Assignee: The Boeing Company, Chicago, IL (US)

( * ) Notice: Subject to any disclaimer, the term of this patent is extended or adjusted under 35 U.S.C. 154(b) by 559 days.

(21) Appl. No.: 13/188,380

(22) Filed: Jul. 21, 2011

(65) Prior Publication Data

US 2013/0021197 A1    Jan. 24, 2013

(51) Int. Cl.
*G01S 13/00*    (2006.01)
*H03K 9/00*    (2006.01)
*H03D 1/04*    (2006.01)
*H04L 1/04*    (2006.01)
*H04B 1/10*    (2006.01)
*G01S 7/02*    (2006.01)

(52) U.S. Cl.
CPC ...................................... *G01S 7/021* (2013.01)
USPC ................. 342/89; 342/90; 342/98; 342/159; 342/195; 342/196; 375/316; 375/346; 375/349; 375/350

(58) Field of Classification Search
CPC .......... H04B 3/32; H04B 1/123; G01S 7/021; G01S 7/285; G01S 7/288; G01S 7/36; G01S 7/38; G01S 3/043; H04L 27/2647; H04L 25/03038; G01R 23/16; G01R 23/167
USPC ........................ 342/13–20, 89–103, 134–141, 342/159–164, 195–197, 202–204; 375/285, 375/316, 346, 349, 350
See application file for complete search history.

(56) References Cited

U.S. PATENT DOCUMENTS

| 4,131,766 | A | * | 12/1978 | Narasimha ..................... 370/484 |
| 4,301,454 | A | * | 11/1981 | Bailey .............................. 342/13 |
| 4,893,266 | A | * | 1/1990 | Deem ........................... 708/405 |
| 5,323,391 | A | * | 6/1994 | Harrison ....................... 370/210 |
| 5,396,489 | A | * | 3/1995 | Harrison ....................... 370/210 |
| 5,451,956 | A | * | 9/1995 | Lochhead ....................... 342/13 |
| 5,473,332 | A | * | 12/1995 | James et al. .................. 342/159 |
| 5,477,227 | A | * | 12/1995 | Noneman ..................... 342/195 |
| 5,537,435 | A | * | 7/1996 | Carney et al. ................. 375/219 |
| 5,550,546 | A | * | 8/1996 | Noneman et al. ............... 342/13 |
| 5,572,213 | A | * | 11/1996 | Noneman et al. ............... 342/13 |

(Continued)

OTHER PUBLICATIONS

International Search Report, PCT Application Ser. No. PCT/US2012/043637, Sep. 21, 2012.

(Continued)

*Primary Examiner* — Peter Bythrow
(74) *Attorney, Agent, or Firm* — Vista IP Law Group LLP; Cynthia A. Dixon (57) ABSTRACT

A system, method, and apparatus for radar pulse detection using a digital radar receiver are disclosed herein. In electronic warfare (EW), radars operate in an environment with highly dense electronic waveforms. As a result, the radars may receive thousands or millions of radar pulses every second. To detect and sort out radar pulses emitted from different radars is a challenging problem in electronic warfare. The present disclosure teaches a radar pulse detection system that utilizes digital channelization and joint-channel detection techniques to detect and separate radar pulses that are sent from different radar emitters. The main features of the present disclosure are: 1.) a digital channelization technique to separate radar pulses from their mixtures; 2.) a multi-channel detection technique to detect radar pulses; and 3.) an innovative technique to separate overlapped radar pulses.

20 Claims, 11 Drawing Sheets

(56) References Cited

U.S. PATENT DOCUMENTS

| | | | | |
|---|---|---|---|---|
| 5,590,156 | A | * | 12/1996 | Carney .................. 375/316 |
| 5,602,876 | A | * | 2/1997 | Noneman et al. ............. 375/317 |
| 5,606,575 | A | * | 2/1997 | Williams .................. 375/219 |
| 5,870,436 | A | * | 2/1999 | Kolanek et al. ............... 375/316 |
| 5,955,987 | A | * | 9/1999 | Murphy et al. ........... 342/357.29 |
| 5,999,573 | A | * | 12/1999 | Zangi ............................ 375/316 |
| 6,005,900 | A | * | 12/1999 | Zangi ............................ 375/350 |
| 6,043,771 | A | * | 3/2000 | Clark et al. ...................... 342/13 |
| 6,072,994 | A | | 6/2000 | Phillips et al. .................. 455/84 |
| 6,480,535 | B1 | * | 11/2002 | Witmayer ..................... 375/232 |
| 6,867,727 | B1 | * | 3/2005 | Mitra .............................. 342/59 |
| 6,898,235 | B1 | * | 5/2005 | Carlin et al. .................. 375/219 |
| 7,006,474 | B2 | * | 2/2006 | Oates et al. ................... 370/334 |
| 7,081,848 | B1 | * | 7/2006 | Adams .......................... 342/118 |
| 7,474,719 | B2 | * | 1/2009 | Arunachalam ............... 375/345 |
| 8,045,654 | B1 | * | 10/2011 | Anderson ..................... 375/342 |

OTHER PUBLICATIONS

Wang Zongbo et al: "Design and application of DRFM system based on digital channelized receiver", RADAR, 2008 International Conference on, IEEE, Piscataway, NJ, USA, Sep. 2, 2008, pp. 375-378, XP031350484, DOI: 10.1109/RADAR.2008.4653950, ISBN: 978-1-4244-2321-7, abstract, figure 2.

P.P. Vaidyanathan, Multirate Digital Filters, Filter Banks, Polyphase Networks, and Applications: A Tutorial, Proceedings of the IEEE, vol. 78, No. 1, Jan. 1990.

* cited by examiner

RADAR PULSE DETECTION USING A DIGITAL RADAR RECEIVER

BACKGROUND

The present disclosure relates to radar pulse detection. In particular, it relates to radar pulse detection using a digital radar receiver.

SUMMARY

The present disclosure relates to a system, method, and apparatus for radar pulse detection using a digital radar receiver. In particular, the disclosed method involves inputting at least one radar signal into a mixer. The method further involves mixing at least one radar signal with a mixing signal to downconvert at least one radar signal. Also, the method involves applying anti-aliasing filtering to at least one downconverted signal that is outputted from the mixer. In addition, the method involves inputting at least one filtered signal into an analog-to-digital (A/D) converter to convert at least one filtered signal from an analog signal to a digital signal. Additionally, the method involves applying digital channelization to at least one digital signal that is outputted from the A/D converter to sort at least one digital signal into different frequency bands. Further, the method involves applying radar pulse detection to at least one sorted digital signal to detect the radar pulses from noise. Additionally, the method involves applying parameter estimation to the detected radar pulses to estimate parameters of the detected radar pulses.

In one or more embodiments, the method further involves receiving at least one radar signal by at least one antenna. In at least one embodiment, at least one radar signal is a radio frequency (RF) signal. In some embodiments, the mixing signal is a sinusoidal signal.

In at least one embodiment, the method further comprises generating, with a frequency generator, the mixing signal. In one or more embodiments, at least one radar signal is downconverted to an intermediate frequency (IF). In some embodiments, the different frequency bands that at least one digital signal is sorted into are adjacent frequency bands. In one or more embodiments, radar pulse detection detects the radar pulses by separating the radar pulses that occur in different channels, that overlap in adjacent channels, and that overlap in time. In at least one embodiment, the parameters estimated are energy, frequency, amplitude, pulse width, and/or pulse repetition rate (PRF). In some embodiments, the estimated parameters provide radar source characterization and/or target parameter characterization.

In one or more embodiments, a system for radar pulse detection using a digital radar receiver involves a mixer, an anti-aliasing filter, an analog-to-digital (A/D) converter, a digital channelizer, a radar pulse detector, and a parameter estimator. In one or more embodiments, the mixer is for mixing at least one radar signal to downconvert at least one radar signal. Also, the anti-aliasing filter is for applying anti-aliasing filtering to at least one downconverted signal that is outputted from the mixer. In addition, the A/D converter is for converting at least one filtered signal from an analog signal to a digital signal. Additionally, the digital channelizer is for applying digital channelization to at least one digital signal that is outputted from the A/D converter to sort at least one digital signal into different frequency bands. Further, the radar pulse detector is used for detecting the radar pulses from noise for at least one sorted signal. In addition, the parameter estimator is for estimating parameters of the detected radar pulses.

In at least one embodiment, the system further involves at least one antenna, where at least one antenna is for receiving at least one radar signal. In one or more embodiments, at least one radar signal is a radio frequency (RF) signal. In at least one embodiment, the mixing signal is a sinusoidal signal. In one or more embodiments, the system further involves a frequency generator, where the frequency generator is for generating the mixing signal. In some embodiments, at least one radar signal is downconverted to an intermediate frequency (IF).

In one or more embodiments, the different frequency bands that at least one digital signal is sorted into are adjacent frequency bands. In some embodiments, radar pulse detection detects the radar pulses by separating the radar pulses that occur in different channels, that overlap in adjacent channels, and that overlap in time. In at least one embodiment, the parameters estimated are energy, frequency, amplitude, pulse width, and/or pulse repetition rate (PRF). In some embodiments, the estimated parameters provide radar source characterization and/or target parameter characterization.

The features, functions, and advantages can be achieved independently in various embodiments of the present inventions or may be combined in yet other embodiments.

DRAWINGS

These and other features, aspects, and advantages of the present disclosure will become better understood with regard to the following description, appended claims, and accompanying drawings where:

DESCRIPTION

The methods and apparatus disclosed herein provide an operative system for radar pulse detection. Specifically, this system relates to radar pulse detection using a digital radar receiver.

In electronic warfare (EW), radars operate in an environment with highly dense electronic waveforms. As a result, the radars may receive thousands or millions of radar pulses every second. To detect and sort out radar pulses emitted from different radars is a challenging problem in electronic warfare. The present disclosure teaches a radar pulse detection system that utilizes digital channelization and joint-channel detection techniques to detect and separate radar pulses that are sent from different radar emitters. The main features of the present disclosure are: 1.) a digital channelization technique to separate radar pulses from their mixtures; 2.) a multi-channel detection technique to detect radar pulses; and 3.) an innovative technique to separate overlapped radar pulses. Experimental results show that the disclosed radar pulse detection system is effective to detect and separate the mixture of radar pulses in a highly noisy environment.

Currently, in electronic warfare, existing radars use many different types of analog/optical receivers to perform different functions. However, these analog/optical receivers are neither efficient in computation nor in cost. A single digital radar receiver can be used to replace many types of these radar receivers and to perform many radar tasks. The purpose of the present disclosure is to develop advanced radar pulse detection techniques for use with digital radar receivers. In addition, the present disclosure presents a framework for the use of digital radar receivers.

Most existing radar receivers are analog/optical receivers. Therefore, current radar pulse detection techniques are based on analog/optical signal processing techniques, which are not efficient and consume more energy than digital computing techniques. The disclosed pulse detection technique is based on digital signal processing techniques, which are more powerful and consume much less energy than the existing analog/optical signal processing techniques. With the advancement of large-scale digital computing technologies, digital receivers are able to perform multiple complex functions in a single receiver unit, and to perform highly complicated algorithms in real-time computation. With field-programmable gate array (FPGA) technologies, digital receivers are able to adaptively tailor algorithms to fit different applications. A single digital receiver is able to provide super-computing power in a small unit.

In the following description, numerous details are set forth in order to provide a more thorough description of the system. It will be apparent, however, to one skilled in the art, that the disclosed system may be practiced without these specific details. In the other instances, well known features have not been described in detail so as not to unnecessarily obscure the system.

1. Introduction

In electronic warfare (EW), an advanced radar system often has to use several different types of radar receivers to perform different functions, which makes the radar system inefficient and high cost. With the advancement of digital computing technologies, digital radar receivers are able to perform multiple functions in one receiver unit. Compared to the existing analog/optical radar receivers, digital radar receivers have many advantages, such as real-time computing, low-power consumption, changing algorithms/configurations on the fly, low cost to manufacture, and compact in size. As such, digital radar receivers are a good candidate to be a key technology for future electronic warfare technologies. In the present disclosure, a computing structure for a digital radar receiver is presented.

Radars that work in EW applications generally have to operate in an environment with highly dense electronic waveforms, which means that the radars may receive thousands or millions of radar pulses every second. The mixture of a large amount of radar pulses makes radar pulse detection and separation a very challenging task for radar receivers in EW. A radar pulse detection system is disclosed that uses a digital radar receiver. In addition, a digital channelization technique that uses a polyphase filterbank is used to separate radar pulses transmitted from different radar emitters. To detect radar pulses from noise and clutter, a multi-channel detection technique is employed that uses the information obtained from multiple adjacent channels to detect radar pulses. Furthermore, a technique is utilized that uses the discontinuity of signal envelopes to separate timely overlapped radar pulses. Experimental results show that the disclosed radar pulse detection system is effective to detect and separate dense radar pulses in a noisy environment.

2. Digital Radar Receiver

The main advantage of using a digital radar receiver is that it can process radar data using the power of a digital computer. As such, employing a digital radar receiver makes it possible to perform multiple complex tasks in a single receiver, to process complex radar data in real time, to achieve very low power consumption, and to have a powerful radar receiver that is small in size and lightweight. Ideally, a digital receiver can process raw radar data that is directly obtained from the radar antenna. However, this requires an analog-to-digital (A/D) converter with a very high clock rate and a very wide bandwidth, which is not available with today's techniques. A more practical digital radar receiver would contain an analog signal mixer to down convert radar signals into the intermediate frequency (IF) range.

Figure 1:
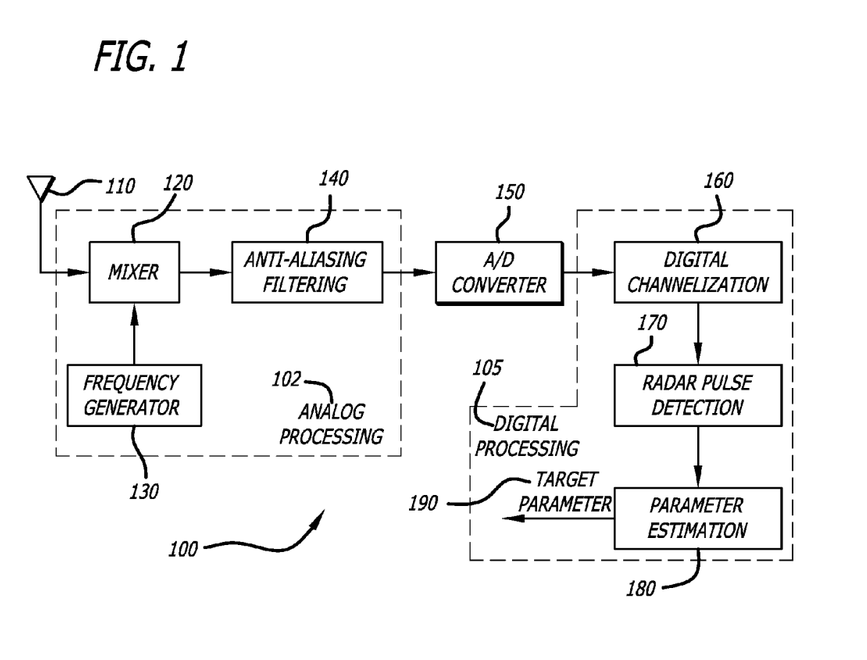
FIG. 1 shows a system diagram of a digital radar receiver, in accordance with at least one embodiment of the present disclosure.

FIG. 1 shows a system diagram of a digital radar receiver 100, in accordance with at least one embodiment of the present disclosure. In this figure, the radar system 100 contains an analog processing part 102 and a digital processing part 105. In the analog processing part 102, radar signals (i.e. radio frequency (RF) signals) are received at the antenna 110. These signals are too high frequency to be directly converted to digital signals and processed digitally. So, these signals are inputted to a mixer 120 that down converts the signals into the IF range. The frequency down conversion is accomplished by mixing (i.e. multiplying) 120 the signals from the antenna 110 with a sinusoidal signal that is generated by a frequency generator 130. The resultant signals have frequency components that represent the sum and difference between the RF frequencies and the frequency generator 130 sinusoid.

Then, anti-aliasing filtering 140 is applied to the signals for limiting the bandwidth of the signals before being inputted into the A/D converter 150. The anti-aliasing filtering 140 attenuates the sum frequency components and passes the lower IF frequency signals to the A/D converter 150. The A/D converter 150 samples the analog radar signals to produce digital radar signals. In the digital processing part 105, digital channelization 160 is used to sort out the digital radar signals into different frequency bands, where the radar signals that are emitted from different radar emitters are able to be separated. Specifically, the digital signals are binned into multiple adjacent narrow frequency bands or channels using digital channelization 160. The radar signals are often mixed with noise and clutter.

Radar pulse detection 170 is used to detect radar pulses from noisy radar signals in each frequency subband. In particular, radar pulse detection 170 detects radar pulses that occur in different channels, radar pulses that overlap in adjacent channels, and/or radar pulses that overlap in time. Finally, the parameters of the radar signals are estimated from the detected radar pulses by parameter estimation 180. Parameter estimation 180 estimates the parameters of the pulses to provide radar source or target parameter 190 characterization. Types of parameters estimated include, but are not limited to, energy, frequency, amplitude, pulse width, and pulse repetition rate (PRF). Many existing techniques can be used in the analog processing part, which is technically matured. The main challenge of a digital radar receiver is the digital processing part. The present disclosure is mainly focused on the digital processing part, especially for digital channelization and radar pulse detection.

Figure 2:
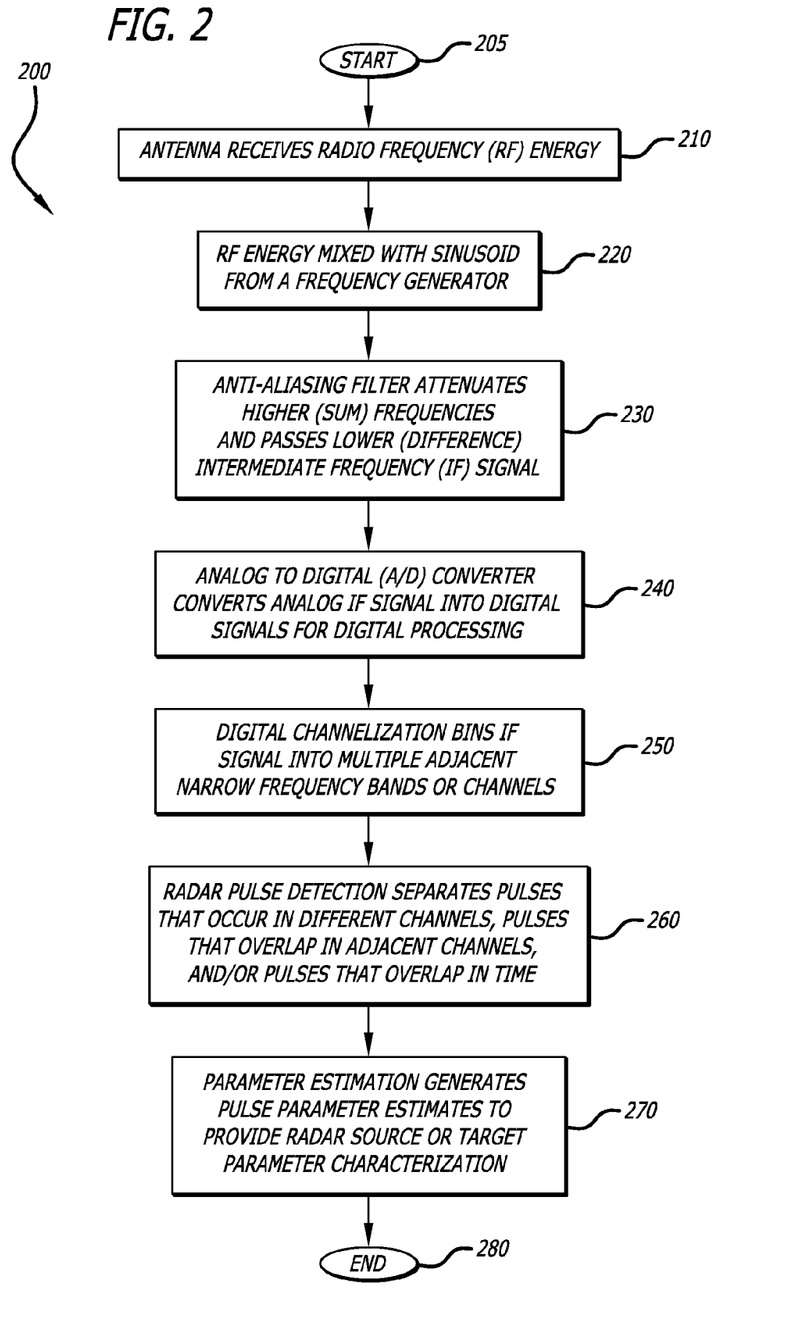
FIG. 2 shows a flow diagram of the process for the operation of the digital radar receiver of FIG. 1, in accordance with at least one embodiment of the present disclosure.

FIG. 2 shows a flow diagram 200 of the process for the operation of the digital radar receiver 100 of FIG. 1, in accordance with at least one embodiment of the present disclosure. At the start 205 of the process, multiple radars emit radio frequency (RF) pulses. After the RF pulses are emitted, an antenna receives the RF energy from the emitted pulses 210. The received RF radar signals are mixed with a sinusoid generated by a frequency generator 220. The resultant signal has frequency components that represent the sum and difference between the RF frequencies and the frequency generator sinusoid. Then, an anti-aliasing filter attenuates higher (sum) frequencies and passes the lower (difference) intermediate frequency (IF) signal 230. An analog-to-digital (A/D) converter then converts the analog IF signal into digital signals for digital processing 240. Then, digital channelization bins the IF signal into multiple adjacent narrow frequency bands or sub-band channels 250. Radar pulse detection separates pulses that occur in different channels, pulses that overlap in adjacent channels, and/or pulses that overlap in time 260. Then, parameter estimation generates pulse parameter estimates to provide radar source or target parameter characterization 270. This process 200 provides estimates of the radar source or target parameter characteristics for frequency, amplitude, pulse width, and/or pulse repetition rate (PRF).

3. Digital Channelization

Since different radar signals use different carrier frequencies, in the frequency domain, different radar signals can be separated by sorting them into different frequency channels. Channelization is a technique to separate radar signals in the frequency domain. Most channelization techniques use filterbanks to cover the target spectrum range for separating radar signals into different frequency bands. The major challenging issues in using filter-banks are cross-band talks and real time computing.

An ideal band-pass filter has a rectangular function in the frequency domain, and a sin c function in the time domain. This means that in the time domain, a filter with an infinite filter length is needed in order to achieve an ideal band-pass filter. However, a filter with an infinite filter length does not allow for real time computing and is not practical. With a finite filter length, a band-pass filter does not have an ideal frequency response, and has a transition band. In a filter bank with a finite filter length, adjacent frequency bands have overlapped transition bands, which result in cross-band talks. As such, it is important to design a filter bank with a given filter length that can minimize overlapped transition bands, thereby minimizing the cross-band talks.

Real-time computing is an important feature of a digital radar receiver because IF frequencies used in radars are very high frequencies. This means that after the A/D converter, the digital radar signals need to be sampled at a very high sampling rate. The channelization component has to process a huge amount of digital data in every second. Therefore, a computationally efficient filterbank is important for achieving real time computing.

In the present disclosure, a polyphase filterbank is used to achieve the digital channelization function. The main advantage of using a polyphase filterbank is its efficiency in computation. In a polyphase filterbank, the input signals are first down sampled, and then are filtered by the filterbank with a much lower sampling rate. Therefore, a polyphase filterbank is computationally much faster than conventional filterbanks.

Figure 3:
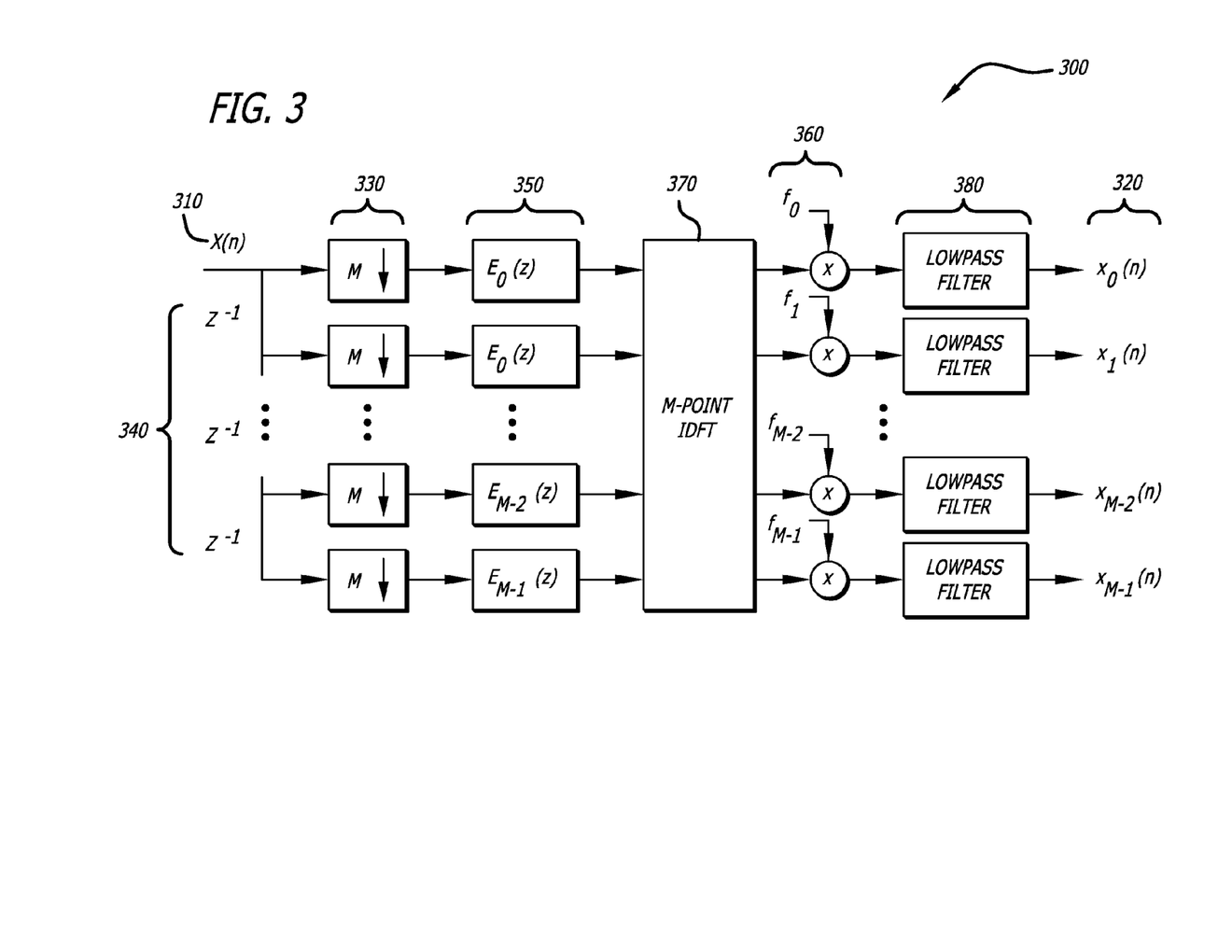
FIG. 3 shows a system diagram of polyphase filterbank based channelization, in accordance with at least one embodiment of the present disclosure.

FIG. 3 shows a system diagram of polyphase filterbank based digital channelization 300 with M subbands (i.e. channels). In this figure, the input X(n) 310 are digital radar signals, and the output of the channelization are the M subband signals, $x_i(n)$, where $i=0, 1, \ldots, M-1$, 320. The symbol M↓ 330 is a decimation operation with a factor of M; the symbol $Z^{-1}$ 340 is a time-delay operation; $E_i(z)$, $i=0, 1, \ldots, M-1$, 350 are filter responses of subband filters; and $f_i$, $i=0, 1, \ldots, M-1$, 360 are center frequencies of the subband filters. The M-point inverse digital Fourier transform (IDFT) box 370 indicates that an M-point inverse digital Fourier transform is performed. The low pass filters 380 filter out the higher frequency terms that result from the mixing operation preformed by $f_i$ 360. The subband filters are determined by the following equations:

$$E_i(z) = \sum_{n=-\infty}^{n=+\infty} e_i(n) z^{-n} \qquad (1)$$

and $$e_i(n) = h(Mn + i), \; 0 \leq i \leq M - 1 \qquad (2)$$

The function h(n) is the impulse response of the first low-pass filter 380 in the filterbank. The input 310 is a digital radar signal, and the output 320 of the channelization is M subband signals. Because of the decimation operation at the input, the channelization operation is actually performed at a data rate that is M times lower than the data rate of the input signal.

The data rate of the output signals is also M times lower than the data rate of the input signal. This greatly reduces the computation for the operations of pulse detection and parameter estimations.

4. Multi-Channel Pulse Detection

Because of the cross-band (i.e. cross-channel) talks of the filterbank used in the channelization process, a radar signal may be present in several subbands (channels). This makes the radar pulse detection process more difficult. The pulse detection process needs not only to detect radar pulses from noise and clutter, but also to determine which channel the detected pulses belong to from among several possible channels. With this difficulty, a multi-channel pulse detection technique is employed that uses signals from multiple channels (i.e. subbands) to detect radar pulses. This solves the problem of pulse detection and the problem of channel determination at the same time.

Figure 4:
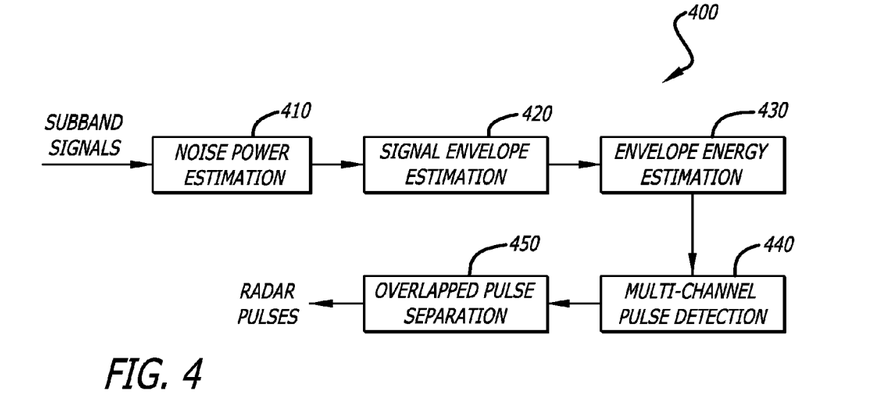
FIG. 4 shows a system diagram of the multi-channel pulse detection process, in accordance with at least one embodiment of the present disclosure.

FIG. 4 shows a system diagram of the multi-channel pulse detection process 400, in accordance with at least one embodiment of the present disclosure. The detection process 400 is applied to every subband signal obtained from the channelization process. In the pulse detection process 400, noise power is first estimated within a small window (i.e. Noise Power Estimation 410). The noise power is used to set a threshold for estimating signal envelopes (i.e. Signal Envelope Estimation 420). Then, energy powers of the signal envelopes are estimated (i.e. Envelope Energy Estimation 430). The envelope powers obtained from multiple channels are used to detect radar pulses from the signal envelopes (i.e. Multi-channel Pulse Detection 440) and to determine the correct channel from the multiple channels for the detected pulses. Then, any overlapped pulses are separated (i.e. Overlapped Pulse Separation 450).

In the function block of Noise Power Estimation 410, noise variance is estimated from an incoming digital signal sequence. Only when the signal sequence contains no radar pulses, will the estimated variance be the noise variance. However, it is not possible to determine when the signal sequence contains no radar pulses. Because of this, a set of signal variances will be estimated, and then the minimal one will be determined to be the noise variance. For this technique, a sliding window is used to estimate a set of signal variances, and the average of the smallest three estimated variances is determined to be the noise variance. Mathematically, it can be described as follows. Let $s(i)$, $i=1, 2, \ldots, I$ be the digital signal sequence, and $\Pi(\sigma) = \{\sigma_m: m=1, 2, \ldots, M\}$ be a set of estimated variances from the signal sequence, that is, $$\sigma_m = \frac{1}{L-1} \sum_{i=m}^{m+L} [s(i) - \bar{s}]^2 \quad (3)$$

and $$\bar{s} = \frac{1}{L} \sum_{i=1}^{L} s(i) \quad (4)$$

Here, the variable L is the length of the sliding data window. From the set of signal variances, a subset of the variances is selected, $$V(\sigma) \subseteq \Pi(\sigma) \quad (5)$$

with $V(\sigma) = \{\sigma_t \in \Pi(\sigma); \sigma_t \leq \text{the least K variance in } \Pi(\sigma)\}$ Then, noise variance, $\sigma_{ns}$, is computed by the equation:

$$\sigma_{ns} = \frac{1}{K} \sum_{i=1}^{K} \sigma_i; \sigma_i \in V(\sigma) \quad (6)$$

In the function block of Signal Envelope Estimation 420, signal envelopes are estimated using the estimated noise variance. The signal envelopes are potential radar pulses. At first, the estimated noise variance is used as a threshold to find all of the peak values of the signal sequence. Then a smooth filtering is applied to the peak values to remove some noise. Finally, a linear interpolation procedure is applied to the peak values to obtain the envelope of the signal sequence.

Figure 5:
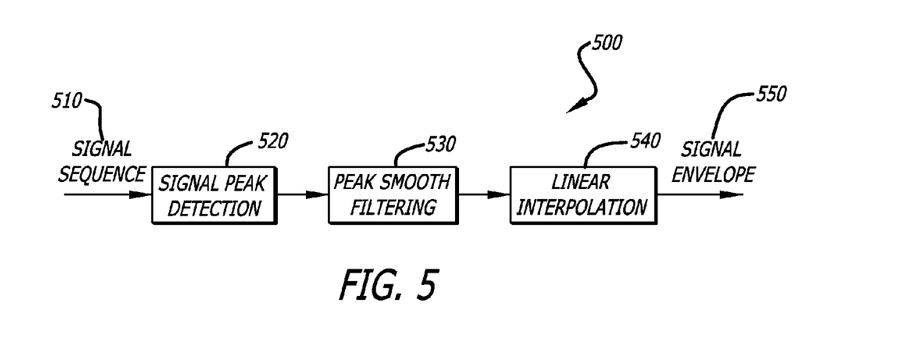
FIG. 5 shows a block diagram of the function block of Signal Envelope Estimation of FIG. 4, in accordance with at least one embodiment of the present disclosure.

FIG. 5 shows a block diagram 500 of the function block of Signal Envelope Estimation 420 of FIG. 4, in accordance with at least one embodiment of the present disclosure. Mathematically, the process can be described as follows.

Let $s(i)$, $i=1, 2, \ldots, I$, be the input signal sequence 510, and $Pk(i)$ be the peak signal of the signal sequence 510. The peak signal is computed by:

$$Pk(i) = \begin{cases} s(i), & \text{if } s(i) > s(i-1) \text{ and} \\ & s(i) > s(i+1) \\ & \text{and } s(i) > \eta \\ 0, & \text{otherwise} \end{cases} \quad (7)$$

The threshold value $\eta$ is determined by the estimated noise variance.

First, the Signal Peak Detection 520 detects the peak signal of the signal sequence 510. Then, the Peak Smooth Filtering 530 is performed. The Peak Smooth Filtering 530 is a lowpass filtering achieved by filtering the peak signal with a moving average filter with a finite length. The purpose of the peak smooth filtering 530 is to remove noise points in the peak signal. The Linear Interpolation 540 process is performed. The Linear Interpolation 540 process is a standard linear interpolation technique, which fills-in the discrete values between any two peaks of the signal to obtain an envelope 550 of the signal.

The function block of Envelope Energy Estimation 430 in FIG. 4 is to compute the energy of every signal envelope, which is used in multi-channel pulse detection.

$$E_{pk} = \frac{1}{N} \sum_{i=1}^{N} Pk(i)^2 \quad (8)$$

In multi-channel pulse detection 440, multiple channels are used to detect radar pulses, and to determine the right channel for the detected radar pulses. The reason why multiple channels for pulse detection are used is that almost every radar pulse is present in multiple channels due to the cross-channel talks and limited bandwidth of each channel. If a radar signal is located at the center of a channel, the cross-channel talks will leak a small amount of the energy of the signal into adjacent channels. Also, if the radar signal is near the boundary of a channel, a significant amount of the energy of the signal will go to the adjacent channel. In addition, if the signal is located on the boundary of a channel, half of the energy of the signal will be present in two adjacent channels. Therefore, it is desirable to examine a possible radar pulse over several channels for achieving optimal radar pulse detection.

For the disclosed multi-channel detection technique 440, envelope signals are used for the pulse detection since envelope signals carry all of the possible radar pulses. The pulse detection is performed in each individual channel, but envelope signals from several adjacent channels are used in the detection process. In the detection process, for an envelope in an under-examining channel, first all of the corresponding envelopes are searched for in the adjacent channels. Then, energy of all of the corresponding envelopes are compared with the energy of the target envelope. If the target envelope has higher energy than all of the corresponding envelopes, then it is determined to be a radar pulse. Otherwise, it is treated as noise or a leaked pulse. Mathematically, the detection process 440 is described as follows.

Let $x^k(n)$, $n=1, 2, \ldots, N$ be the envelope signal of channel k, and it contains a set of envelopes, $Env^k(e)=\{e_i^k\}$ with $e_i^k=\{x^k(i), \ldots, x^k(L_i)\}$. The variables i and $L_i$ are the starting time index and the end time index of the envelope, respectively. For every envelope $e_i^k$, within a given time window, the corresponding envelopes are found in the adjacent channels, that is, in signals $x^{k-1}(n)$ and $x^{k+1}(n)$. Let $e_j^{k-1}$ and $e_v^{k+1}$ be the corresponding envelopes in channels k−1 and k+1, respectively. The time differences of |i−j| and |i−v| must be less than a predetermined threshold, which is generally a few time steps. Then, the energy ratios are computed as:

$$r_1 = \frac{\|e_i^k\|^2}{\|e_j^{k-1}\|^2} \text{ and } r_2 = \frac{\|e_i^k\|^2}{\|e_v^{k+1}\|^2} \qquad (9)$$

The energies are calculated by Equation (8). Then, the energy ratios are compared against two predetermined thresholds, $\gamma_{min}$ and $\gamma_{max}$. The detection function is given by:

$$D(e_i^k) = \begin{cases} 1, & \text{if } r_1 \geq \gamma_{min} \text{ and} \\ & r_2 \geq \gamma_{min} \text{ and} \\ & r_1 \text{ or } r_2 \geq \gamma_{max} \\ 0, & \text{Otherwise} \end{cases} \qquad (10)$$

Within a channel, there may be more than one radar signal, which means that not all pulses come from one radar emitter. To separate different radar pulses that are within one channel, the pulse-widths are compared to the amplitudes to separate them. However, in experimental tests, it was assumed that no more than two radar signals were within one channel. Otherwise, the number of channels would have needed to be increased.

In some cases, an envelope of the envelope signals may contain two radar pulses. This is due to two radar pulses being partially overlapped in the time domain. For two radar signals with completely overlapped pulses in the time domain, if the two signals are not in the same channel or in adjacent channels, they are well detectable and separable. Otherwise, they are not distinguishable with the disclosed techniques. The disclosed techniques only separate partially overlapped radar pulses. These techniques for overlapped pulse separation 450 are described in the next section.

5. Separation Of Overlapped Pulse

There are two types of overlapped pulses. One type of overlapped pulse is one where both of the radar signals belong to one channel (referred to in the present disclosure as Type I). The other type of overlapped pulse is one where the two radar signals are in two adjacent channels (referred to in the present disclosure as Type II). The two types of overlapped pulses have different properties. Type I overlapped pulses have the same shapes of envelopes in adjacent channels, while the Type II overlapped pulses have different shapes of envelopes in the adjacent channels.

Figure 6A:
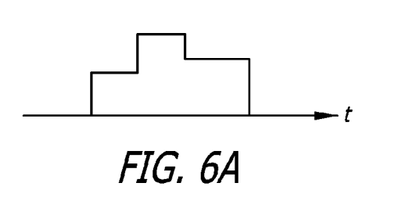
FIG. 6A shows exemplary Type I overlapped pulses, in accordance with at least one embodiment of the present disclosure.
Figure 6B:
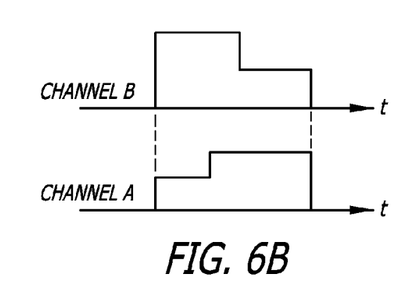
FIG. 6B shows exemplary Type II overlapped pulses, in accordance with at least one embodiment of the present disclosure.

FIG. 6A shows exemplary Type I overlapped pulses, in accordance with at least one embodiment of the present disclosure. And, FIG. 6B shows exemplary Type II overlapped pulses, in accordance with at least one embodiment of the present disclosure. To separate the overlapped pulses, the process, at first, is to identify the types of overlapped pulses. Then, the process separates the pulses in a different way for the different types.

Figure 7:
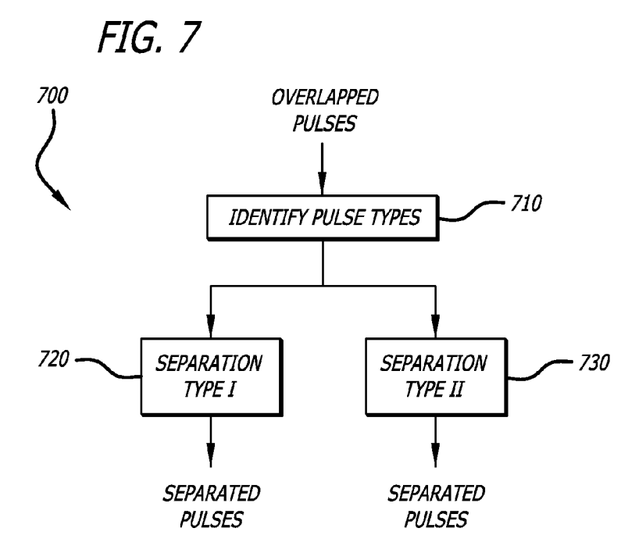
FIG. 7 shows a block diagram of the pulse separation process, in accordance with at least one embodiment of the present disclosure.

FIG. 7 shows a block diagram of the pulse separation process 700, in accordance with at least one embodiment of the present disclosure. In this figure, the pulse types (i.e. Type I or Type II) of the overlapped pulses are first determined 710. After the types of the overlapped pulses are determined, the specific separation technique for the particular types are applied to the overlapped pulses in order to separate the pulses (i.e. the separation technique for Type I pulses is applied to the Type I pulses 720, and the separation technique for the Type II pulses is applied to the Type II pulses 730).

The key to separate overlapped pulses is to find critical time points, at which the envelope's values are discontinuously changed. A differential operator is used to find the discontinuous points on the envelopes. That is, let $$sp(t) = \frac{\partial e_i(t)}{\partial t} \qquad (11)$$

Then, a set of critical time points is computed by:

$$T^* = \{t_k; sp(t_k) \geq \tau\} \qquad (12)$$

The variable $\tau$ is a threshold value. By using the critical time points, the overlapped pulses can be separated.

Figure 8:
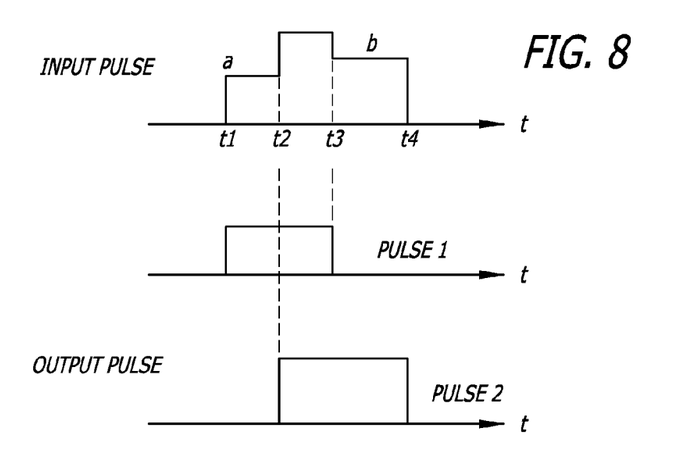
FIG. 8 depicts separation of the Type I overlapped pulses of FIG. 6A, in accordance with at least one embodiment of the present disclosure.
Figure 9:
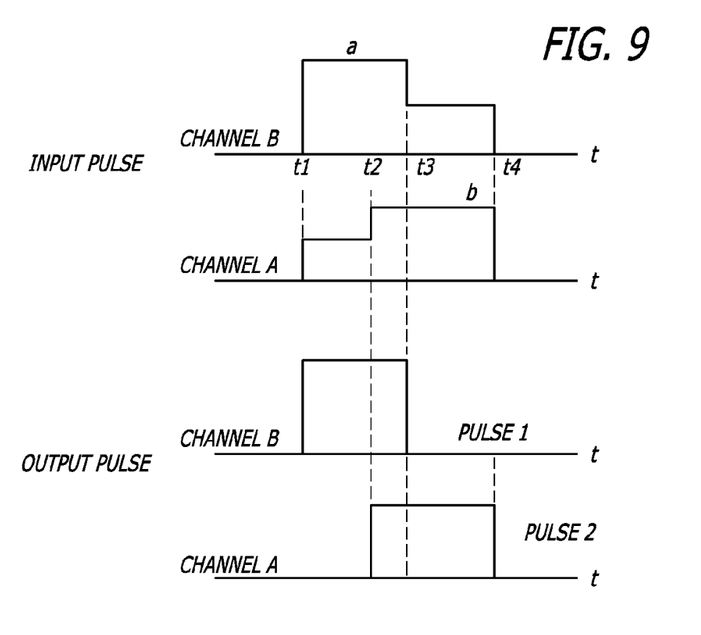
FIG. 9 depicts separation of the Type II overlapped pulses of FIG. 6B, in accordance with at least one embodiment of the present disclosure.

FIGS. 8 and 9 graphically depict the pulse separation process 700 of FIG. 7. Specifically, FIG. 8 depicts separation of the Type I overlapped pulses of FIG. 6A, in accordance with at least one embodiment of the present disclosure. And, FIG. 9 depicts separation of the Type II overlapped pulses of FIG. 6B, in accordance with at least one embodiment of the present disclosure.

For the Type I overlapped pulses, separated pulses are determined by:

$$p_1(n) = \begin{cases} a; & t1 \leq n \leq t3 \\ 0; & \text{otherwise} \end{cases}$$

and $$p_2(n) = \begin{cases} b; & t2 \leq n \leq t4 \\ 0; & \text{otherwise} \end{cases}$$

Both pulses are in the same channel.

For the Type II overlapped pulses, separated pulses are determined by:

$$p_1(n) = \begin{cases} a; & t1 \leq n \leq t3 \\ 0; & \text{otherwise,} \end{cases}$$

which is in channel B.

and $$p_2(n) = \begin{cases} b; & t2 \leq n \leq t4 \\ 0; & \text{otherwise,} \end{cases}$$

which is in channel A.

In the separation of Type II overlapped pulses, the two adjacent channels need to be processed together.

6. Experiment

To evaluate the disclosed pulse detection system, five radar signals were generated with different parameters. All of the five signals are modulated-rectangular-pulse waveforms. The carrier frequency (fc), modulation type, PRI, and pulse-width (pwd) for the five signals are described as follows:

1.) fc=50 MHz, PSK, PRI=0.04 ms pwd=2.5 μs
2.) fc=100 MHz, FSK, PRI=0.03 ms pwd=2.5 μs
3.) fc=150 MHz, QAM, PRI=0.045 ms, pwd=3.0 μs
4.) fc=200 MHz, PSK, PRI=0.05 ms, pwd=3.5 μs
5.) fc=250 MHz, PSK, PRI=0.035 ms, pwd=2.8 μs A 1 GHz sampling frequency was used to sample the five signals. At the antenna of a radar receiver, a combined signal was received.

Figure 10:
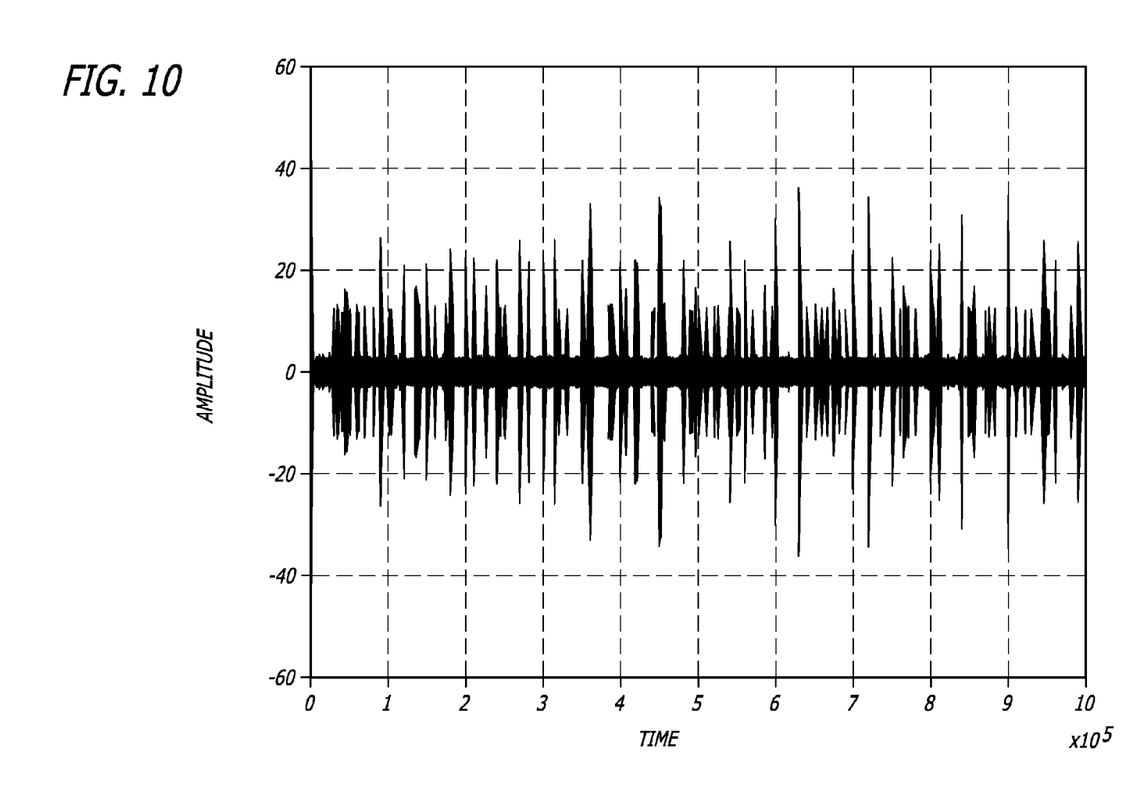
FIG. 10 shows an exemplary combined signal, which contains five radar signals and has a signal-to-noise ratio of 15 dB, in accordance with at least one embodiment of the present disclosure.

FIG. 10 shows an exemplary combined signal, which contains the above-mentioned five radar signals and has a signal-to-noise ratio of 15 dB, in accordance with at least one embodiment of the present disclosure. The vertical axis represents the combined signal plus noise amplitude as a function of time on the horizontal axis. The five radar signals are completely mixed together. A white Gaussian distribution was used to generate noise. To separate the radar signals in the frequency domain, a polyphase filterbank with 20 channels was used. Each channel had a bandwidth of 50 MHz. The five radar signals were supposed to present in channel 2 to channel 6.

Figure 11:
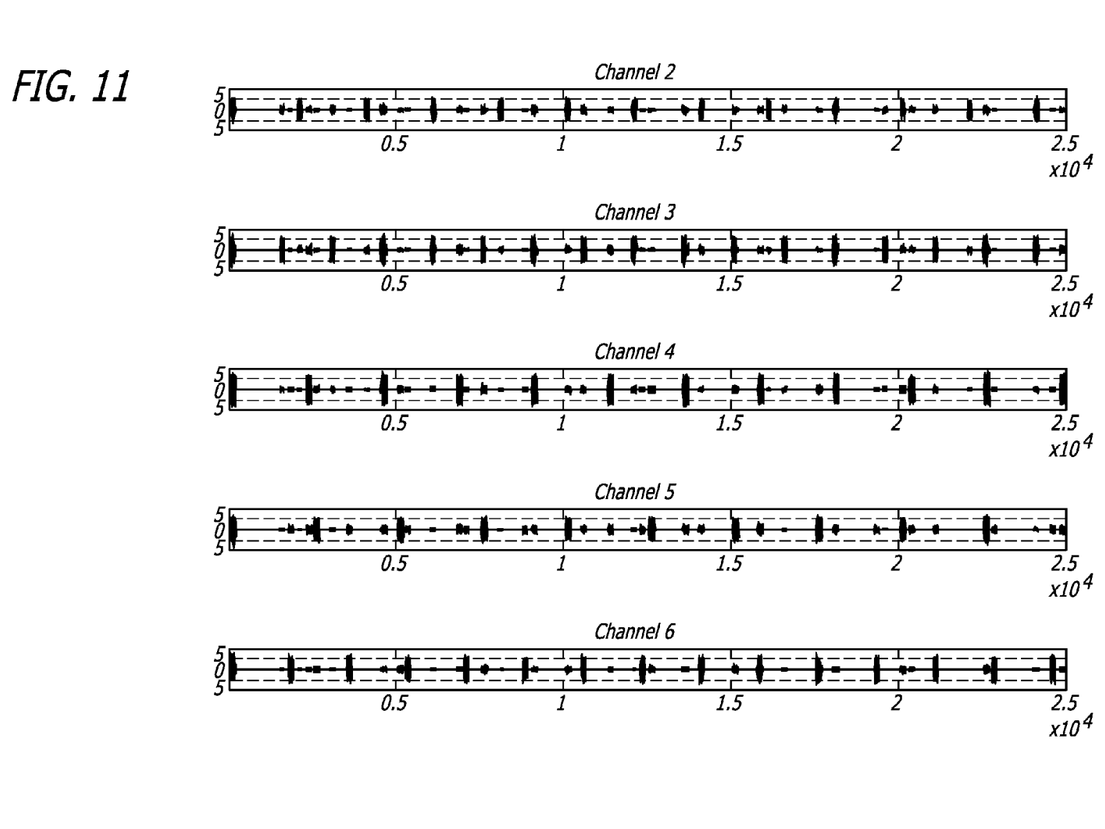
FIG. 11 shows the five channels of the exemplary combined signal of FIG. 10 after digital channelization, in accordance with at least one embodiment of the present disclosure.

FIG. 11 shows the five channels of the exemplary combined signal of FIG. 10 after digital channelization, in accordance with at least one embodiment of the present disclosure. The vertical axes represents the combined signal plus noise amplitude as a function of time on the horizontal axis for each of the channels shown, which are channels 2, 3, 4, 5 and 6. The combined signals were sampled at 1 GHz and separated using a 20 channel polyphase filterbank with 50 MHz channels. The five radar signals are well separated in the five channels, but there are many cross-channel talks, which generate false radar pulses.

Figure 12:
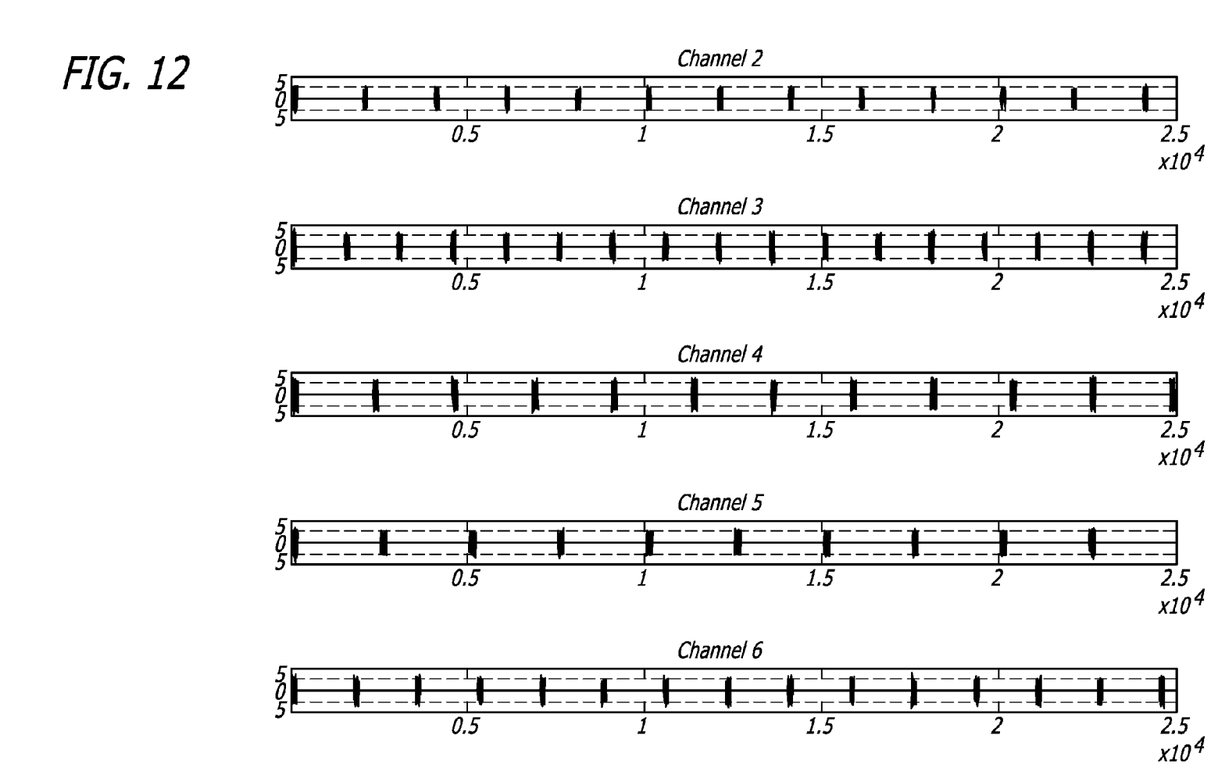
FIG. 12 shows the results of multi-channel detection over the five channels of FIG. 11, in accordance with at least one embodiment of the present disclosure.

FIG. 12 shows the results of multi-channel detection over the five channels of FIG. 11, in accordance with at least one embodiment of the present disclosure. At 15 dB of SNR, almost all of the false pulses were removed after the detection process. The SNR ratio was varied, and the average probability of detection over the five channels was calculated.

Figure 13:
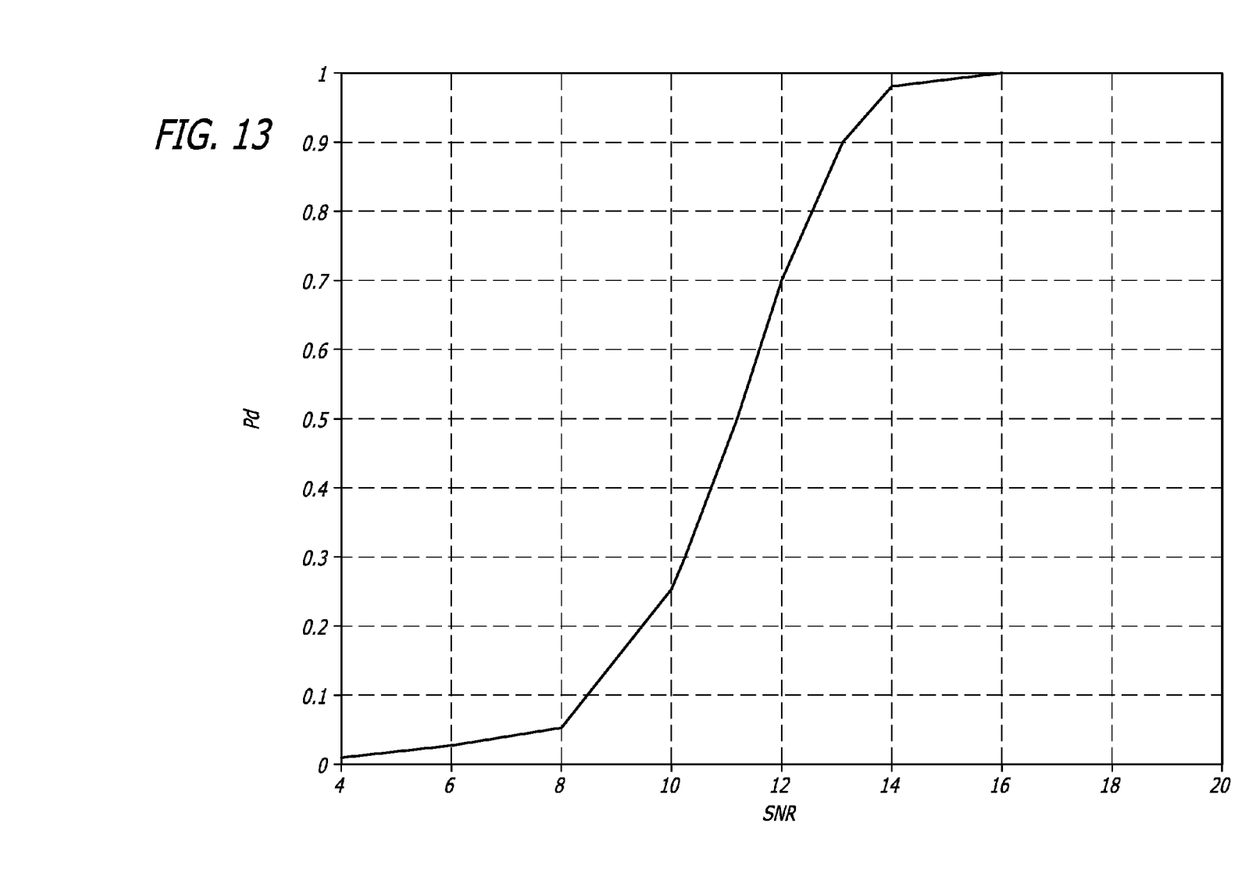
FIG. 13 shows the averaged detection rate achieved over the five channels of FIG. 11, in accordance with at least one embodiment of the present disclosure.

FIG. 13 shows the averaged detection rate achieved over the five channels of FIG. 11, in accordance with at least one embodiment of the present disclosure. The vertical axis represents the probability of pulse detection (Pd) as a function of the input signals SNR on the horizontal axis. As the graph shows, for SNR values greater than 15, the detection rate for these experimental signals is essentially perfect.

Figure 14:
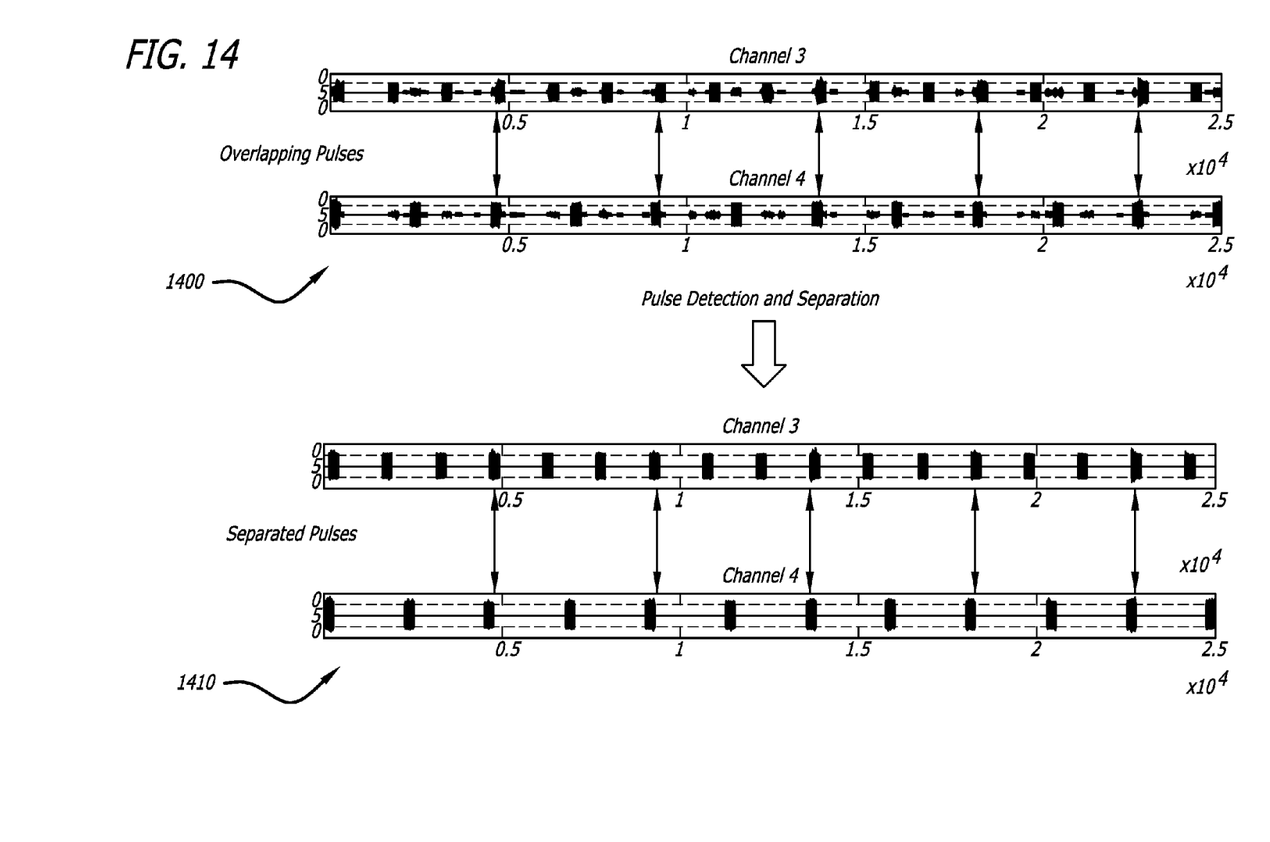
FIG. 14 shows an example of separation of overlapped pulses, in accordance with at least one embodiment of the present disclosure.

FIG. 14 shows an example of separation of overlapped pulses, in accordance with at least one embodiment of the present disclosure. In particular, the top FIG. 1400 shows the amplitudes of signal plus noise on the vertical axes as a function of time on the horizontal axes for channels 3 and 4 with overlapped pulses indicated by the vertical lines. The lower FIG. 1410 shows that these overlapped pulses have been separated by the pulse separation logic.

7. Conclusion

In the present disclosure, a computing structure for a digital radar receiver and a radar pulse detection system is disclosed. In the disclosed radar pulse detection system, a polyphase filterbank based channelization technique is used to sort out radar signals in the frequency domain. A multi-channel pulse detection technique is used to detect radar pulses and to remove noise/clutter and false pulses in each frequency channel. Also, an innovative technique, which uses the discontinuity of signal envelopes, is used to separate timely overlapped radar pulses. Experimental results show that the disclosed radar pulse detection system is effective to detect and to separate radar pulses in a noisy and waveform dense environment.

Although certain illustrative embodiments and methods have been disclosed herein, it can be apparent from the foregoing disclosure to those skilled in the art that variations and modifications of such embodiments and methods can be made without departing from the true spirit and scope of the art disclosed. Many other examples of the art disclosed exist, each differing from others in matters of detail only. Accordingly, it is intended that the art disclosed shall be limited only to the extent required by the appended claims and the rules and principles of applicable law.

I claim:

1. A method for radar pulse detection using a digital radar receiver, the method comprising:
    inputting at least one radar signal into a mixer;
    mixing the at least one radar signal with a mixing signal to downconvert the at least one radar signal;
    applying anti-aliasing filtering to at least one downconverted signal that is outputted from the mixer;
    inputting at least one filtered signal into an analog-to-digital (A/D) converter to convert the at least one filtered signal from an analog signal to a digital signal;
    applying digital channelization to at least one digital signal that is outputted from the A/D converter to sort the at least one digital signal into different frequency bands;
    applying radar pulse detection in the time domain to the at least one sorted digital signal to detect the radar pulses from noise; and
    applying parameter estimation to the detected radar pulses to estimate parameters of the detected radar pulses.

2. The method of claim 1, wherein the method further comprises receiving the at least one radar signal by at least one antenna.

3. The method of claim 1, wherein the at least one radar signal is a radio frequency (RF) signal.

4. The method of claim 1, wherein the mixing signal is a sinusoidal signal.

5. The method of claim 1, wherein the method further comprises generating, with a frequency generator, the mixing signal.

6. The method of claim 1, wherein the at least one radar signal is downconverted to an intermediate frequency (IF).

7. The method of claim 1, wherein the different frequency bands that the at least one digital signal is sorted into are adjacent frequency bands.

8. The method of claim 1, wherein radar pulse detection detects the radar pulses by separating the radar pulses that occur in different channels, that overlap in adjacent channels, and that overlap in time.

9. The method of claim 1, wherein the parameters estimated are at least one of energy, frequency, amplitude, pulse width, and pulse repetition, rate (PRF).

10. The method of claim 1, wherein the estimated parameters provide at least one of radar source characterization and target parameter characterization.

11. A system for radar pulse detection using a digital radar receiver, the system comprising:
    a mixer, wherein the mixer is for mixing at least one radar signal to downconvert the at least one radar signal;
    an anti-aliasing filter, wherein the anti-aliasing filter is for applying anti-aliasing filtering to at least one downconverted signal that is outputted from the mixer;
    an analog-to-digital (A/D) converter, wherein the A/D converter is for converting at least one filtered signal from an analog signal to a digital signal;
    a digital channelizer, wherein the digital channelizer is for applying digital channelization to at least one digital signal that is outputted from the A/D converter to sort the at least one digital signal into different frequency bands;
    a radar pulse detector, wherein the radar pulse detector is used for detecting in the time domain the radar pulses from noise for at least one sorted signal; and
    a parameter estimator, wherein the parameter estimator is for estimating parameters of the detected radar pulses.

12. The system of claim 11, wherein the system further comprises at least one antenna, wherein the at least one antenna is for receiving the at least one radar signal.

13. The system of claim 11, wherein the at least one radar signal is a radio frequency (RF) signal.

14. The system of claim 11, wherein the mixing signal is a sinusoidal signal.

15. The system of claim 11, wherein the system further comprises a frequency generator, wherein the frequency generator is for generating the mixing signal.

16. The system of claim 11, wherein the at least one radar signal is downconverted to an intermediate frequency (IF).

17. The system of claim 11, wherein the different frequency bands that the at least one digital signal is sorted into are adjacent frequency bands.

18. The system of claim 11, wherein radar pulse detection detects the radar pulses by separating the radar pulses that occur in different channels, that overlap in adjacent channels, and that overlap in time.

19. The system of claim 11, wherein the parameters estimated are at least one of energy, frequency, amplitude, pulse width, and pulse repetition, rate (PRF).

20. The system of claim 11, wherein the estimated parameters provide at least one of radar source characterization and target parameter characterization.

\* \* \* \* \*